April 14, 1964 B. A. FIERSTINE 3,129,023
SUSPENSION BALL JOINT ASSEMBLY
Filed July 21, 1961

INVENTOR.
Burton A. Fierstine
BY
W. F. Wagner
ATTORNEY

United States Patent Office 3,129,023
Patented Apr. 14, 1964

3,129,023
SUSPENSION BALL JOINT ASSEMBLY
Burton A. Fierstine, Saginaw, Mich., assignor to General Motors Corporation, Detroit, Mich., a corporation of Delaware
Filed July 21, 1961, Ser. No. 125,760
3 Claims. (Cl. 287—90)

This invention relates generally to wheel suspension and more particularly to ball joint assemblies therefor.

An object of the invention is to provide an improved ball joint assembly.

Another object is to provide a completely assembled and sealed ball joint unit adapted for press fit installation in a cooperating eye formed in a wheel suspension control arm.

A further object is to provide a ball joint assembly having improved and simplified means for sealing the juncture between the ball portion and casing portion of the unit.

A still further object is to provide a ball joint assembly including a flexible sponge-like annular seal adapted to be compressed between the ball joint casing and the portion of the wheel suspension structure to which the ball joint stud is attached.

Still a further object is to provide a ball joint assembly wherein the seal element is formed of polyurethane foam and has upper and lower plastic bearing members bonded thereto.

Yet a further object is to provide a ball joint assembly of the type described wherein the seal is formed and arranged with reference to the ball joint and cooperating suspension parts so as to permit an extremely high range of angular inclination between the joint casing and stud and yet retain optimum sealing efficiency.

Figure 1:
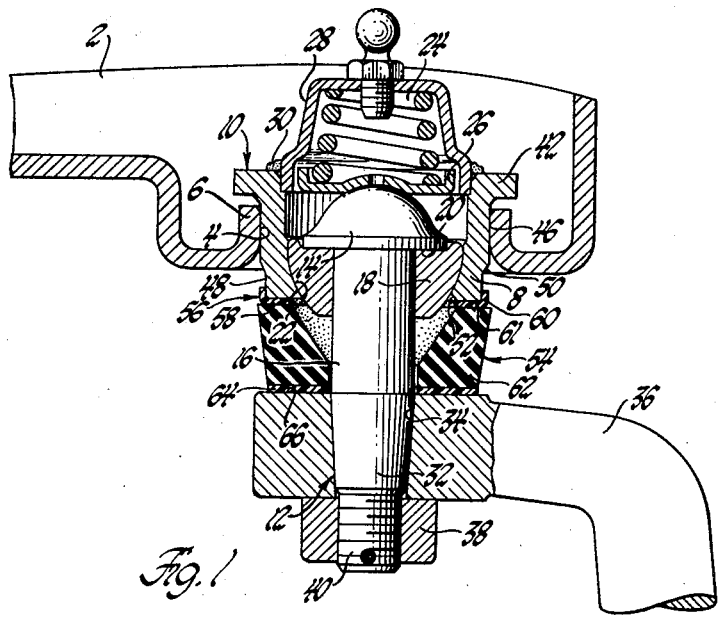
Figure 2:
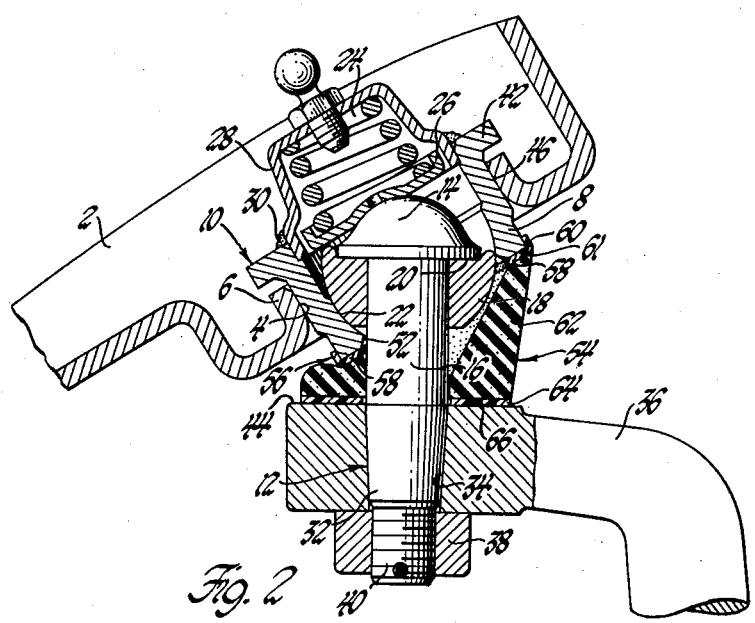

These and other objects, advantages and features of the invention will become more fully apparent as reference is had to the accompanying specification and drawing wherein:

FIG. 1 is an enlarged fragmentary elevational view, partly in section, of a ball joint assembly in accordance with the invention, and showing the relation thereof with associated parts of a vehicle suspension; and FIG. 2 is a view similar to FIG. 1, illustrating the relationship of the parts when the associated suspension structure is in one position of maximum angular displacement.

Referring now to the drawings and particularly FIG. 1, the reference numeral 2 designates the outer extremity of a sheet metal suspension control arm which has formed therein an eye 4 bounded by a cylindrical vertically extending wall 6. Press fitted into eye 4 is the socket portion 8 of a ball joint assembly 10. Assembly 10 includes a stud 12 having a semi-spherical head 14 integral with a depending shank portion 16. A sintered metal bearing ring 18 surrounds shank 16 and abuts upwardly against the shoulder 20 of head 14. The outer surface of ring 18 is semi-spherical in form and engages a corresponding semi-spherical inner wall portion 22 formed at the lower end of socket 8. Stud 12 and ring 18 are maintained in operating relationship with socket 8 by a spring 24 and plate 26 disposed between head 14 and an inverted cup member 28. Cup member 28 in turn is secured over the upper end of socket 8 as by welding 30. Intermediate of its length, shank 16 is formed with a tapered portion 32 which extends into a cooperating tapered bore 34 formed in a wheel knuckle 36. Tapered portion 32 is drawn into locking engagement with bore 34 by a nut 38 which threadably engages the threaded terminal end 40 of stud 12.

In accordance with the general features of the invention, socket portion 8 of ball joint assembly 10 is formed with an upper radially outwardly extending flange portion 42, intermediate outer cylindrical wall 46, and a lower outer cylindrical wall 48. Prior to assembly, the diameter of intermediate cylindrical wall 46 is slightly larger than the inside diameter of eye 4 so that upon assembly, securement results solely from interference fit. To facilitate assembly, the juncture of intermediate wall 46 and lower wall 48 is blended by a chamfer 50 forming a ramp which assists in the initial stage of press fitting. In addition, the reduced diameter of lower wall 48 serves a further purpose shortly to be described.

According to another feature of the invention, the effective spherical diameter of bearing ring 18 of ball stud 12 is relatively great in relation to the vertical dimension of casing 8 so that the lower portion of the bearing ring protrudes downwardly through the opening 52 of casing 8. Accordingly, the diameter of the opening 52 is very large in relation to the diameter of shank 16 and therefore allows a very high range of angular inclination between stud 12 and casing 8.

In accordance with the principal feature of the invention, in order to efficiently seal the juncture between bearing ring 18 and opening 52 and yet tolerate the high angular inclination referred to, there is provided a sandwich type annular seal 54 which includes an upper plastic bearing element 56 having a flat surface 58 and a peripheral upturned flange 60. Surface 58 abuts the lower edge 61 of socket 8 and flange 60 closely fits the periphery of lower wall portion 48 of casing 8 to prevent lateral shift of the bearing relative to the socket. Bonded to the lower wall of bearing 56 and surrounding shank 16 is an annular flexible body 62 formed of urethane foam. Bonded in turn to the lower end of body 62 is a second plastic bearing element 64 which surrounds shank 16 and bears against the flat top wall 66 of steering knuckle 36. Urethane foam element 62 is preferably formed to a density of 6 to 7 pounds per cubic foot and prior to installation has an axial length approximately twice the vertical distance between the lower edge 61 of casing 8 and surface 66 of knuckle 36. As previously mentioned, the peripheral flange 60 of bearing element 56 is piloted on lower wall portion 48 of socket 8, which is smaller in diameter than the intermediate wall 46 thereof. In this way, any scoring of the outer wall of casing 8 resulting from the press fit installation occurs only on intermediate wall 46 and therefore preserves the smooth surface of lower wall 48 necessary for free rotation of bearing 56 during turning movements of wheel knuckle 36.

By reference to FIG. 2, it will be seen that the foam portion 62 of seal 54 readily accommodates extreme angular inclination of stud 12 relative to casing 8, yet upon return to the normal position shown in FIG. 1, the foam portion 62 is restored to a symmetrical configuration of relatively small diameter. By contrast, rubber boots and other heretofore known seals capable of tolerating high angular inclination are necessarily bulky and tend to become pinched or cut and thereafter fail to properly seal the interior of the joint assembly against entrance of foreign matter. In addition to the above, the present invention affords the further advantage of inherently providing the resilient forces acting in the proper direction to maintain the bearing portions of the seal in the desired operating position. Whereas, rubber boots require the addition of clamps, springs or other securing devices to maintain the seal in assembled relation with the joint.

While but one embodiment of the invention has been shown and described, it will be apparent that other changes and modifications may be made therein. It is, therefore, to be understood that it is not intended to limit the invention to the embodiment shown, but only by the scope of the claims which follow.

I claim:

1. A ball joint assembly comprising a cylindrical casing having a reduced diameter lower end portion and a parti-spherical socket, an aperture in said casing communicating with one end of said socket, a stud extending through said aperture having a parti-spherical end portion disposed in tiltable and rotatable bearing engagement with said socket, means for sealing the juncture of said aperture and said parti-spherical end portion comprising an axially compressed annular plastic body surrounding said stud and axially abutting said socket, said body including solid plastic bearing portions at either end thereof bonded to an intermediate flexible foam portion, one of said solid plastic bearing portions being formed with an upturned peripheral flange piloted on the reduced diameter lower end portion of said socket.

2. A ball joint assembly comprising a cylindrical casing having a parti-spherical socket, an aperture in said casing communicating with one end of said socket, a stud extending through said aperture having a parti-spherical end portion disposed in tiltable and rotatable bearing engagement with said socket, the effective diameter of said parti-spherical end portion in relation to the depth of said socket being such that a substantial portion of the former normally protrudes through said aperture and the diameter of said stud adjacent said parti-spherical portion is less than one half the effective diameter of said parti-spherical portion, and means for sealing the juncture of said aperture and parti-spherical end portion comprising an axially compressed plastic annular body surrounding said stud and axially abutting said socket, said body including solid plastic bearing portions at either end thereof bonded to an intermediate flexible foam portion.

3. The structure set forth in claim 2 wherein the plastic annular body in assembled relation is axially compressed to approximately one half its free axial length so that the entire circumference of the annular plastic body remains compressively loaded throughout the full range of tilting movement of said assembly.

References Cited in the file of this patent

UNITED STATES PATENTS

| | | |
|---|---|---|
| 1,908,789 | Ragan | May 16, 1933 |
| 2,281,097 | Flumerfelt | Apr. 28, 1942 |
| 2,872,206 | Cislo | Feb. 3, 1959 |
| 3,024,050 | Moskovitz | Mar. 6, 1962 |
| 3,059,292 | Harris | Oct. 23, 1962 |

OTHER REFERENCES

The publication "Polyurethanes," by Bernard A. Dombrow, copyright 1957 by Reinhold Pub. Corp., New York, page 50 relied on.